US011477639B2

(12) United States Patent
Winkelvos (10) Patent No.: US 11,477,639 B2
(45) Date of Patent: Oct. 18, 2022

(54) METHOD FOR PROTECTED COMMUNICATION BETWEEN A VEHICLE AND AN EXTERNAL SERVER, DEVICE FOR PERFORMING KEY DERIVATION IN THE METHOD, AND VEHICLE

(71) Applicant: Volkswagen Aktiengesellschaft, Wolfsburg (DE)

(72) Inventor: Timo Winkelvos, Sickte (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 2 days.

(21) Appl. No.: 17/003,894

(22) Filed: Aug. 26, 2020

(65) Prior Publication Data
US 2021/0067959 A1 Mar. 4, 2021

(30) Foreign Application Priority Data
Aug. 28, 2019 (DE) ...................... 10 2019 212 959.5

(51) Int. Cl.
*H04L 9/08* (2006.01)
*H04W 12/041* (2021.01)
(Continued)

(52) U.S. Cl.
CPC ......... *H04W 12/041* (2021.01); *H04L 9/0819* (2013.01); *H04L 9/0866* (2013.01);
(Continued)

(58) Field of Classification Search
CPC . H04W 12/04; H04W 12/041; H04W 12/037; H04W 12/06; H04W 12/10;
(Continued)

(56) References Cited

U.S. PATENT DOCUMENTS

| 10,237,077 B2 | 3/2019 | Winkelvos et al. |
| 2015/0263856 A1 | 9/2015 | Leboeuf et al. ............... 713/184 |

(Continued)

FOREIGN PATENT DOCUMENTS

| DE | 102017204538 A1 | 9/2018 | ............. G06F 19/00 |
| EP | 3157281 A1 | 4/2017 | ............... H04L 9/08 |

(Continued)

OTHER PUBLICATIONS

German Office Action, Application No. 102019212959.5, 7 pages.
(Continued)

*Primary Examiner* — Shaqueal D Wade-Wright
(74) *Attorney, Agent, or Firm* — Slayden Grubert Beard PLLC (57) ABSTRACT

A method for protected communication is provided. The method comprises defining master keys for different service domains within the scope of influence of a vehicle manufacturer generating a master key reference for the vehicle within the range of influence of the vehicle manufacturer, securely introducing one or more of the cryptographic keys derived from at least one of the defined master keys and the associated master key reference into the vehicle, and transmitting to an external server a message signed with one of the derived cryptographic keys, which is additionally provided with the master key reference and the current status of the vehicle. The method further comprises deriving the at least one cryptographic key in the external server from the master key identified by the master key reference depending on the key status of the vehicle, and checking the authenticity of the signed message with the derived cryptographic key.

21 Claims, 4 Drawing Sheets

(51) Int. Cl.
  *H04W 12/106* (2021.01)
  *H04W 12/037* (2021.01)
(52) U.S. Cl.
  CPC ......... *H04L 9/0894* (2013.01); *H04W 12/037* (2021.01); *H04W 12/106* (2021.01)
(58) Field of Classification Search
  CPC ... H04L 63/061; H04L 63/04; H04L 63/0428; H04L 63/06; H04L 63/12; H04L 9/08; H04L 9/0866; H04L 9/0894; H04L 9/083; H04L 9/0861; H04L 9/0819; H04L 9/14; H04L 9/32; H04L 9/3247; H04L 9/0816; H04L 9/0825; H04L 9/0817
  See application file for complete search history.

(56) References Cited

U.S. PATENT DOCUMENTS

| | | | |
|---|---|---|---|
| 2016/0012653 A1 | 1/2016 | Soroko | ............ 340/5.61 |
| 2017/0111178 A1 | 4/2017 | Winkelvos et al. | ............ 713/175 |
| 2017/0134382 A1* | 5/2017 | Darnell | ............ H04L 9/3297 |
| 2017/0200324 A1* | 7/2017 | Chennakeshu | ...... H04L 63/0442 |
| 2018/0076959 A1* | 3/2018 | Komano | ............ G09C 1/00 |
| 2018/0227120 A1 | 8/2018 | Takemori et al. | |
| 2019/0028267 A1 | 1/2019 | Takemori et al. | |
| 2019/0238325 A1* | 8/2019 | Takemori | ............ H04L 9/3271 |
| 2020/0213287 A1* | 7/2020 | Zhang | ............ H04L 12/40045 |
| 2020/0380326 A1* | 12/2020 | Kawaguchi | ........ G06K 19/0723 |
| 2021/0111874 A1* | 4/2021 | Tanji | ............ H04L 63/0435 |

FOREIGN PATENT DOCUMENTS

| | | | |
|---|---|---|---|
| KR | 20070039157 A | 4/2007 | ............ G11B 20/00 |
| KR | 20190013009 A | 2/2019 | ............ H04L 9/08 |
| WO | 2018/167253 A1 | 9/2018 | ............ H04L 9/32 |

OTHER PUBLICATIONS

Extended European Search Report, Application No. 20192390.1, 8 pages.
Korean Office Action, Application No. 2021095936720, 5 pages.

* cited by examiner

METHOD FOR PROTECTED COMMUNICATION BETWEEN A VEHICLE AND AN EXTERNAL SERVER, DEVICE FOR PERFORMING KEY DERIVATION IN THE METHOD, AND VEHICLE

CROSS-REFERENCE TO RELATED APPLICATIONS

This application claims priority to German Patent Application No. DE 10 2019 212 959.5, filed on Aug. 28, 2019 with the German Patent and Trademark Office. The contents of the aforesaid Patent Application are incorporated herein for all purposes.

TECHNICAL FIELD

The invention relates to a method for protected communication between a vehicle and an external server. The external server may for example be a backend server of the vehicle manufacturer or of a service provider to whom the vehicle manufacturer has granted the corresponding authorization. The invention furthermore relates to a device for performing the key derivation in the method, as well as a correspondingly equipped vehicle.

The invention relates to the field of data security in the digital age. From the technical field of cryptography, various techniques are known for encrypting and securely exchanging data. The main goals of protecting databases are confidentiality (access protection), integrity (change protection), authenticity/forgery protection and liability (non-reputability). The invention will be explained using the example of secure data exchange between a modern vehicle and an Internet service provider. In this context, there are various challenges.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Asymmetric keys are currently the basis for secured communication, such as TLS communication between vehicles and back-end servers of Internet service providers. A typical example is HTTPS communication that is used to realize a secured Internet link in browsers.

Such encryption methods will become worthless as of time X. Time X is the date on which so-called quantum computers with certain properties become available. An enormous boost in computing power is anticipated through them because significant parallelism in computing operations as possible by means of the superposition principle that they use. The introduction of these quantum computers will also affect the methods of cryptography because it will make some encrypting methods vulnerable. The associated problem is also termed the post-quantum challenge in the professional world.

From today's perspective, one potential solution is envisioned in securing all communication with different backend servers on the Internet as of time X only with 256 bit symmetrical cryptography. In doing so, the encrypting algorithm AES 256 could be used with 256 bit keys corresponding to the advanced encryption standard. With the introduction of AES 256, $2^{254.4}$ computing steps are required according to the best currently known encrypting algorithm. Even with the first two generations of quantum computers, this would not be possible within an acceptable time.

It is therefore currently assumed that in the future, 256 bit keys will be introduced into vehicles that will be used for secured data exchange.

SUMMARY

With symmetrical cryptography, a problem may however exist that the same keys must also be revealed to the particular Internet service provider. This is associated with a security risk, and a large number of vehicle-specific keys must be distributed. There is therefore a need to improve key administration for the various Internet service providers.

The aforementioned methods authenticate software to be imported, but not the establishment of authenticated communication.

An object thus exists to reduce the security risk when using the symmetrical cryptography method for solving the post-quantum challenge (PQC).

This object is solved by a method for protected communication by a vehicle with an external server, by an electronic device for performing key derivation, and a vehicle according to the independent claims.

Embodiments of the invention are discussed in the dependent claims and the following description.

The details of one or more embodiments are set forth in the accompanying drawings and the description below. Other features will be apparent from the description, drawings, and from the claims.

DESCRIPTION

Specific embodiments of the invention are described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In one exemplary aspect, a method for protected communication by a vehicle comprises the steps:

defining a number of master keys for different service domains within the scope of influence of a vehicle manufacturer, generating a master key reference for the vehicle or for a control unit of the vehicle within the range of influence of the vehicle manufacturer, introducing one or more of the cryptographic keys derived from at least one of the defined master keys and the associated master key reference into the vehicle, or into a control unit of the vehicle, within the range of influence of the vehicle manufacturer, transmitting—from the vehicle to an external server—a message, signed with one of the derived cryptographic keys, which is additionally provided with the master key reference and the current status of the vehicle, deriving the cryptographic key in the server from the master key identified by the master key reference depending on the key status of the vehicle, checking the authenticity of the signed message with the derived cryptographic key in the external server.

In the method of this exemplary aspect, it is assumed that a secure process exists for parameterizing the backend systems that makes it possible to import the keys into the backend systems without endangering the confidentiality of these keys. This process is used to import the (domain) master keys into the service centers distributed worldwide.

The benefit of this method is that security is enhanced when it is necessary, due to the PQC problem, to use symmetrical encrypting algorithms with AES 256 or higher, or an equivalent other encrypting algorithm. Therefore, it is unnecessary to store the same keys with the various service providers as in the vehicle. Moreover it is unnecessary to have to store numerous vehicle-specific keys because the individual keys may be derived from a saved master key.

In the exemplary method, the plurality of the cryptographic keys derived from the at least one defined master key are derived from the master key for various key states of the vehicle. The algorithm for key derivation is designed so that it also includes the key state for key derivation. The correct key is accordingly only derived correctly when the key state is also known. The security is based on the fact that the master key is not transmitted. An attacker who does not have access to the domain master keys cannot accordingly derive the genuine key, even with the knowledge of the master key reference or the state information.

In some embodiments, all parameterization processes are posted with the manufacturer and are therefore understandable. By transmitting the key state in the signed message upon requesting a key renewal, it is possible for the manufacturer to no longer have to ensure that the service providers in the trusted group are also informed about the key states of the individual vehicles. The vehicles supply the current key state when they wish to commence secure communication, in particular PQ-secure communication, with a backend server, and the backend servers of the service providers of the trusted group may therefore derive the correct keys without the manufacturer having to continuously synchronize the key states of all vehicles for all service providers of the trusted group with its own records.

To be able to establish the authenticity of the message with which the master key reference and the current key state is transmitted, this message may be signed by the cryptographic key that is to be derived in some embodiments. The signature is therefore generated with the cryptographic key. This cryptographic key also corresponds to the valid current key state of the vehicle.

As a result, the vehicle and the backend server have a common key and may communicate secretly and authentically (encrypted and signed) with its assistance, for example by using the encryption algorithm AES 256-GCM.

In some embodiments, a form of administering the different keys is the establishment of service domains for various economic sectors using one or more of the criteria of vehicle make, vehicle model, year of manufacturer and distribution country or distribution region. Accordingly, not every key set needs to be administered in each computer center of the different service providers.

In some embodiments, different master keys are defined for different service providers or service domains. Then only the master key assigned to the respective service provider needs to be made known to the service provider. Another service provider cannot derive any keys of the first service provider using the master keys known to him.

In some embodiments, the key state of the vehicle is characterized by one or more of the parameters of the identity counter, vehicle identification number, assembly type, control unit type, key type or type learning counter of the key type. Therefore by indicating the key state, the selection may be restricted to different key types and different components of the vehicle.

In some embodiments, the external server of the service provider forwards at least the information on the master key reference and the key state of the vehicle to a security module that performs a derivation of the cryptographic key and transmits it back to the external server of the service provider.

In some embodiments, the security module in the form of a hardware security module performs the derivation of the cryptographic key itself. It is true that a hardware module must be installed at each service provider of the trusted group. These are however more secured against forgery than pure software implementations.

For a device to perform the key derivation in the method for protected communication between a vehicle and a backend server of an Internet service provider and in some embodiments, the device contains a security module with which a key is derived from a saved master key that is selected in a received message by a master key reference noted therein. The device is furthermore designed so that, to derive the key, it also takes into account a key state for the key derivation also transmitted by the vehicle.

The security module that performs the key derivation may be designed as a hardware security module (HSM). These may better safeguard the confidentiality of the data, i.e., in particular the master key saved therein, and cannot be forged so easily.

Finally and in some embodiments, a vehicle is equipped with at least one computing unit that has a protected memory area in a memory in which at least one cryptographic key is saved, and the master key reference and the key state of the vehicle are saved therein or in another memory area.

The various embodiments discussed herein may be combined with one another, if not stated otherwise in individual cases.

Reference will now be made to the drawings in which the various elements of embodiments will be given numerical designations and in which further embodiments will be discussed.

In the exemplary embodiments, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

The present description illustrates the principles of the disclosure according to additional embodiments of the invention. It should therefore be understood that a person skilled in the art will be able to conceive various arrangements which, although not explicitly described here, embody principles of the disclosure and are also to be considered to be within the scope of the invention.

With the inclusion of modern communications technology in vehicles of the future, the vehicles are increasingly becoming communication centers from which many types of services can be used. Ever more additional services that are offered by the manufacturer of the vehicle are also being integrated in the vehicles. Examples of such services are navigation services, security services such as accident warning messages and breakdown assistance calls, remote control services for programming the charging processes of electric vehicles, air conditioning, retrieval of vehicle data, and the location of the vehicle, etc. Workshops may also be incorporated, and vehicles may be called to the workshop, such as in recalls. It is also currently possible to improve some functions of the vehicle from time to time that are realized by software which can occur through software updates. This currently frequently occurs in the workshop. In the future, this will however also increasingly be done online by downloading from a server on the Internet which is also termed download over the air (OTA). For this type of communication, it is necessary to use secured communication methods. Part of the security consists of establishing whether the message originates from an authorized user. This test should reveal attackers who would attempt in an unauthorized manner to obtain access to the vehicle data, functions, etc. Conversely, attackers could attempt to obtain unauthorized access to the offered services.

In the following, the measures through which communication is secured will be explained.

Figure 1:
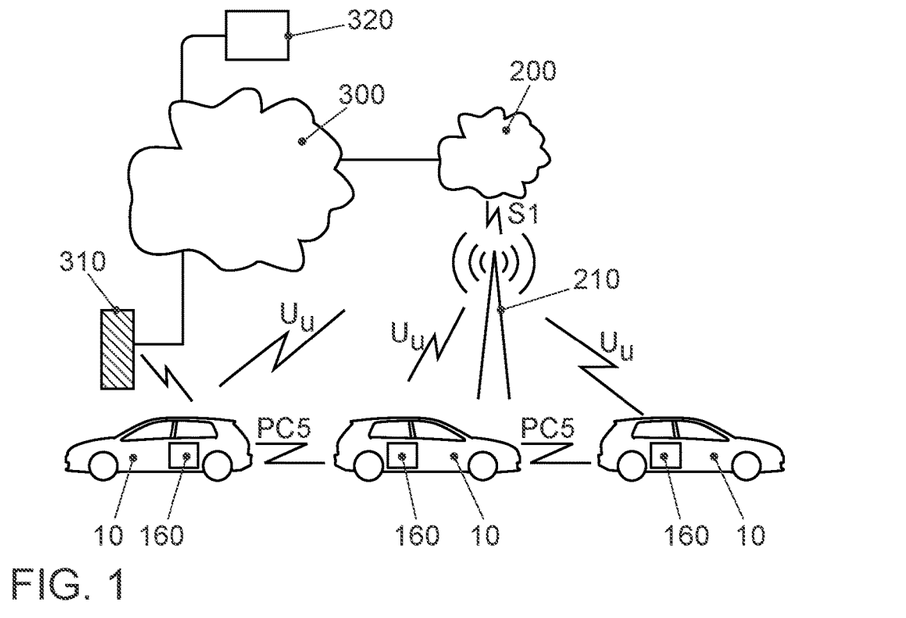
FIG. 1 shows an embodiment of the basic system architecture for mobile communications-assisted communication in the vehicle.

First, FIG. 1 shows an embodiment of the system architecture for vehicle communication by means of mobile communications. Reference numeral 10 identifies a vehicle. The depicted vehicle is designed as a passenger vehicle. This should not be interpreted restrictively; it may be any type of vehicle in corresponding embodiments.

Examples of other types of vehicles are: commercial vehicles, in particular trucks, buses, motorcycles, camping vehicles, agricultural machines, construction machines, rail vehicles, etc. It would generally be possible to use the teachings discussed herein in land vehicles, rail vehicles, watercraft and aircraft. The vehicle 10 is equipped with an onboard communication module 160 with a corresponding antenna unit so that it can participate in the different types of vehicle communication, vehicle-to-vehicle (V2V) and vehicle-to-everything (V2X). FIG. 1 shows that the vehicle 10 can communicate with the mobile communications base station 210 of a mobile communications service provider.

Such a base station 210 may be an eNodeB base station of an LTE wireless carrier (long-term evolution). The base station 210 and the corresponding equipment are part of a cellular communication network with a plurality of mobile communication cells, wherein each cell is operated from a base station 210.

The base station 210 is positioned close to a main street on which the vehicles 10 drive. In the terminology of LTE, a mobile terminal corresponds to user equipment UE that allows a user to access network services, wherein he connects to UTRAN or evolved UTRAN via the radio interface. Typically, such user equipment corresponds to a smartphone. Such mobile terminals are used by passengers in the vehicle 10. In addition, the vehicles 10 are each equipped with an onboard communication module 160. This onboard communication module 160 corresponds for example to an LTE communication module with which the vehicle 10 may receive mobile data (downlink), and send such data in an upwards direction (uplink). This onboard communication module 160 may moreover be equipped with a WLAN p-module in order to be able to participate in an ad hoc V2X communication mode.

V2V and V2X communication is however also supported by the new fifth generation of radio communication systems. In this context, the corresponding radio interface is termed a PC5 interface. With regard to the LTE cellular communication system, the evolved UMTS terrestrial radio access network E-UTRAN of LTE consists of several eNodeBs that provide the E-UTRA user level (PDCP/RLC/MAC/PHY) and the control level (RRC). The eNodeBs are connected to each other by means of the so-called X2 interface. The eNodeBs are also connected via the so-called S1 interface to the EPC (evolved packet core) 200.

From this general architecture, FIG. 1 shows that the base station 210 is connected via the S1 interface to the EPC 200, and the EPC 200 is connected to the Internet 300. A backend server 320 to which the vehicles 10 may send messages and from which they may receive them is also connected to the Internet 300. Finally, a road infrastructure station 310 is also shown. This may for example be illustrated by a roadside unit, frequently termed roadside unit RSU 310 in professional jargon. To simplify implementation, it is assumed that all components have been assigned an Internet address, typically in the form of an Ipv6 address, so that the packets that transport the messages between the components may be correspondingly routed. The cited various interfaces are standardized. Reference in this regard is made to the corresponding LTE specifications that are published.

One measure consists of the concept that the actual keys are not exchanged between the backend server 320 and vehicle 10; instead, the keys to be used are securely introduced into the vehicle 10, and the particular backend server 320 is only delivered a reference to a master key from which it may derive the actual key.

Figure 2:
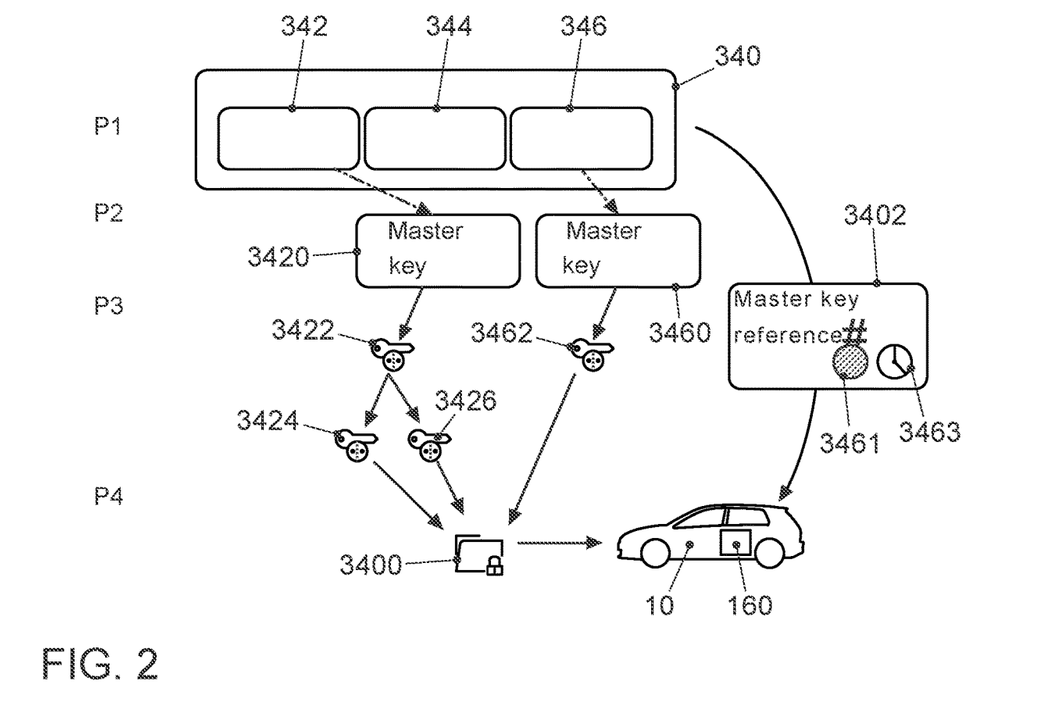
FIG. 2 shows a schematic representation of the sequence of the process of secured incorporation of one or more keys into a specific vehicle according to an embodiment.

FIG. 2 shows an embodiment of how the keys may be securely introduced into the vehicle 10. The entire process may occur within the scope of influence of the manufacturer. This may for example occur within the context of a final check during the production process of the vehicle 10. A compilation of the possible service domains is identified with reference number 340. For example, this compilation may be in a computer center of the vehicle manufacturer in the form of a database. Three different service domains are shown that are identified with reference numbers 342, 344, and 346. The service domains may be defined according to various criteria. Mentioned as examples are the particular make of the vehicle manufacturer, the particular production year as well as the particular distribution region or the particular distribution country. Additional or other criteria as well may be used for classifying the different service domains. In general, various different areas of application such as online services, basic security services, driver assistance and infotainment services may be assigned to the service domains. The domain 342 is also termed a vehicle key management system. Its services are always used when the vehicle 10 is to be programmed with new key data during the time of operation. The domain 344 may for example relate to the issuance of the access key for opening the vehicle. The domain 346 relates to a domain for a certain vehicle model and a certain model year. Many domains different from these domains exist with a large vehicle manufacturer. During production, all of those keys are then compiled and programmed into the vehicle 10 that it needs to access the various services for which it is authorized. In the first step P1, the various master key groups 342, 344, and 346 of the service domains provided for the vehicle 10 are compiled. Of the three shown service domains, the master key groups for the domains 342 and 346 are selected, but not from the domain 344. In the second step P2, the master keys 3420 and 3460 of the selected master key groups 342, 346 are selected for individual vehicles. For this, the vehicle identification number (VIN) may be used. The individual vehicle keys are actually generated from the master keys in the third step P3. The instance is shown in which the shown vehicle 10 is authorized for two different service domains.

Consequently, the cryptographic keys of two different master keys 3420 and 3460 are also derived. On the left, it shows that first a generic key 3422 is derived, and in turn two different cryptographic keys 3424 and 3426 are derived therefrom. The algorithms for key derivation from the master keys and the generic keys are known. For this, for example the algorithms according to NIST SP 800-108 may be used corresponding to the "Recommendation for Key Derivation Using Pseudorandom Functions". It has already been noted that the keys are vehicle-specific. It is however noted that control unit-specific keys are also issued. Keys 3424 and 3426 are shown as an example. The keys are in some embodiments created with a length of 256 bits so that they may also be considered secure for the PQ time. The AES method, which corresponds to the advanced encryption standard, is used as the encryption method. A person skilled in the art is familiar with the method from relevant publications; moreover the AES method is standardized. All keys generated in this manner are compiled in step P4 into a key file 3400 and introduced into the vehicle 10. The key file is written to a highly protected memory area of a computer unit. In addition, a master key reference is generated for each master key 3420 and 3460 that was used for the vehicle 10 for key generation. The master key references are also compiled into an MKR file 3402 and written to the protected memory area. An exemplary format for the structure of the MKR file is shown in FIG. 2. The master key references are saved in a data field of the MKR file 3402. The target country or target region is entered into the data field as a cryptoregion into which the vehicle is delivered. The applicable key state 3463 is also transmitted in the MKR file 3402. There is an independent master key for each domain. The data field may contain keys from several domains. The data field may be configured as a download link container (DLC).

All parameterization processes are entered at the manufacturer's and are therefore understandable. By transmitting the key state in the MKR file upon requesting a key renewal, it is possible for the manufacturer to no longer have to ensure that the service providers in the trusted group are also informed about the key states of the individual vehicles. The vehicles also provide the current key state when they request a key renewal and may then derive the correct keys without the manufacturer having to continuously synchronize the key states for all services (of the trusted group) with its own database. The parameterization procedures include both initial parameterization as well as multiple parameterization, i.e., another parameterization of an already parameterized vehicle. Multiple parameterization is for example necessary if an already parameterized vehicle/control unit is to be exchanged in another group of participants, or a key of the participant must be exchanged.

Figure 3:
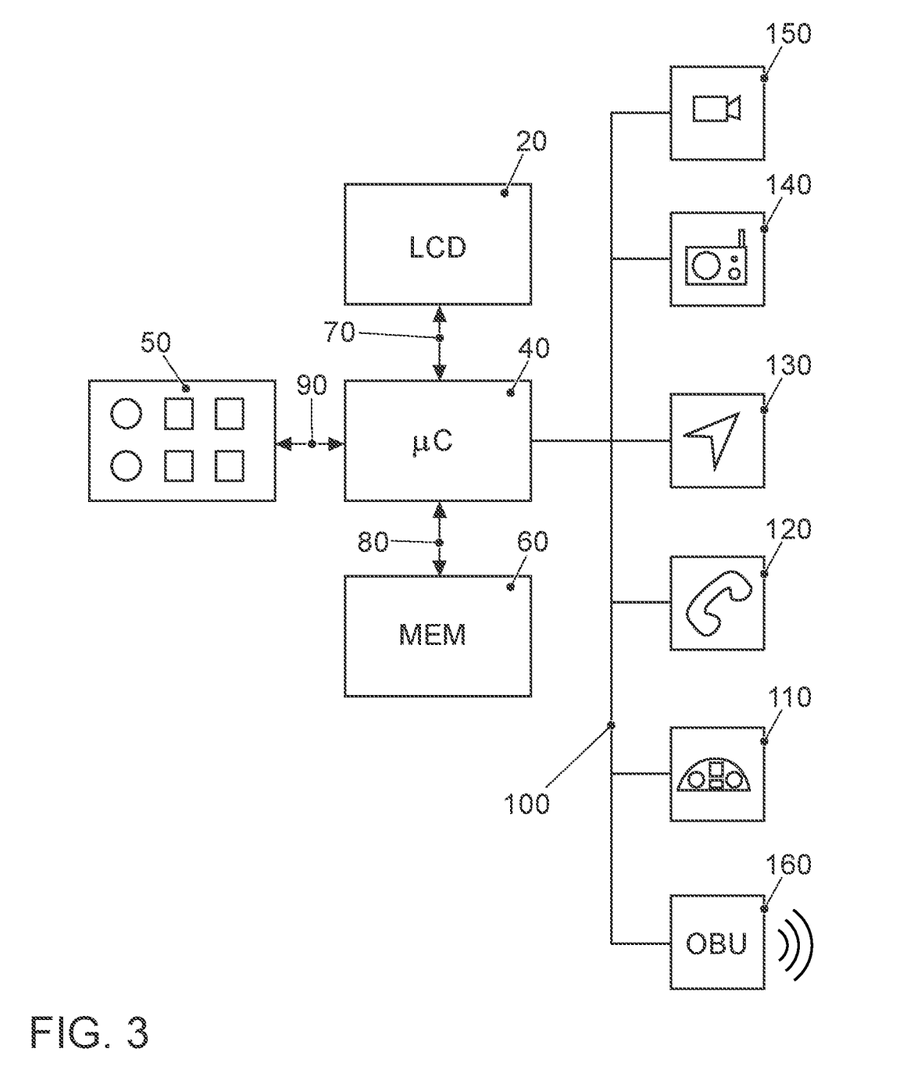
FIG. 3 shows a block diagram of an infotainment system of a vehicle according to an embodiment.

FIG. 3 schematically portrays an exemplary block diagram of the infotainment system of the vehicle 10 as well as an example of some subsystems or applications of the infotainment system. Accordingly, the control device comprises the touch-sensitive display unit 30, a computing unit 40, an input unit 50 and a memory 60. The display unit 30 comprises a display surface for displaying changeable graphical information and also a user interface (touch-sensitive layer) arranged over the display surface for the input of commands by means of a user.

The display unit 30 is connected to the computing apparatus 40 via a data line 70. The data line may be designed in accordance with the LVDS (low-voltage differential signaling) standard. The display unit 30 receives control data for controlling the display surface of the touchscreen 30 from the computing apparatus 40 via the data line 70. Control data relating to the input commands are also transmitted from the touchscreen 30 to the computing apparatus 40 via the data line 70. The input unit is designated by reference number 50. It includes the already-mentioned control elements such as keys, knobs, slide controls or push/twist controls with which the operator may make entries using the menu guide. "Entry" is generally to be understood as selecting a selected menu option as well as changing a parameter, turning a function on and off, etc.

The memory apparatus 60 is connected to the computing apparatus 40 via a data line 80. A pictogram directory and/or symbol directory comprising the pictograms and/or symbols for the possible superimposition of additional information is stored in the memory 60.

The other parts of the infotainment system, camera 150, radio 140, navigation device 130, telephone 120 and instrument cluster 110, are connected via the data bus 100 to the device for operating the infotainment system. The high-speed variant of the CAN bus according to ISO standard 11898-2 is conceivable as the data bus 100. Alternatively, a bus system based on Ethernet technology, such as BroadR-Reach, may also be used, for example. Bus systems that use optical waveguides for the data transmission may also be used. The MOST (Media Oriented System Transport) bus or D2B bus (Domestic Digital Bus) are cited as examples of this. It should at this point be noted that the camera 150 may be designed as a conventional video camera. In this case, the camera records 25 full images per second, which corresponds to 50 half images per second in the interlaced recording mode. Alternatively, a special camera may be used that records several images/sec. to increase precision of object recognition of fast moving objects, or that records the light in a spectrum different than the visible one. Several cameras for observing the surroundings may be used. Additional referenced RADAR or LIDAR systems may also be used in addition or alternatively in order to perform or expand observation of the surroundings. The vehicle 10 is equipped with a communication module 160 for inward and outward wireless communication. This module is often also referred to as an on-board unit. It may be configured for mobile telecommunication, e.g., according to the LTE (long-term evolution) standard. Equally, it may be configured for WLAN (wireless local area network) communication, be it for communicating with devices of the vehicle's occupants or for vehicle-to-vehicle communication, etc. A gateway (not shown) that is connected to one or more additional databases may also be connected to the data bus 100. A few control units (not shown) may be connected thereto.

The files 3400 and 3402 are saved for example in the memory 60 of the computing unit 40. An interface of the infotainment system may be used for this, for example a USB interface that typically is made available in the cockpit of the vehicle. The memory 60 may contain a non-volatile memory area that for example is designed as an EEPROM or FEPROM. Instead of the USB interfaces, the files 3400 and 3402 may alternatively be transmitted directly over the air (OTA). They are then received by the communication module 160 and forwarded to the computing unit 40 and written to the memory 60.

Figure 4:
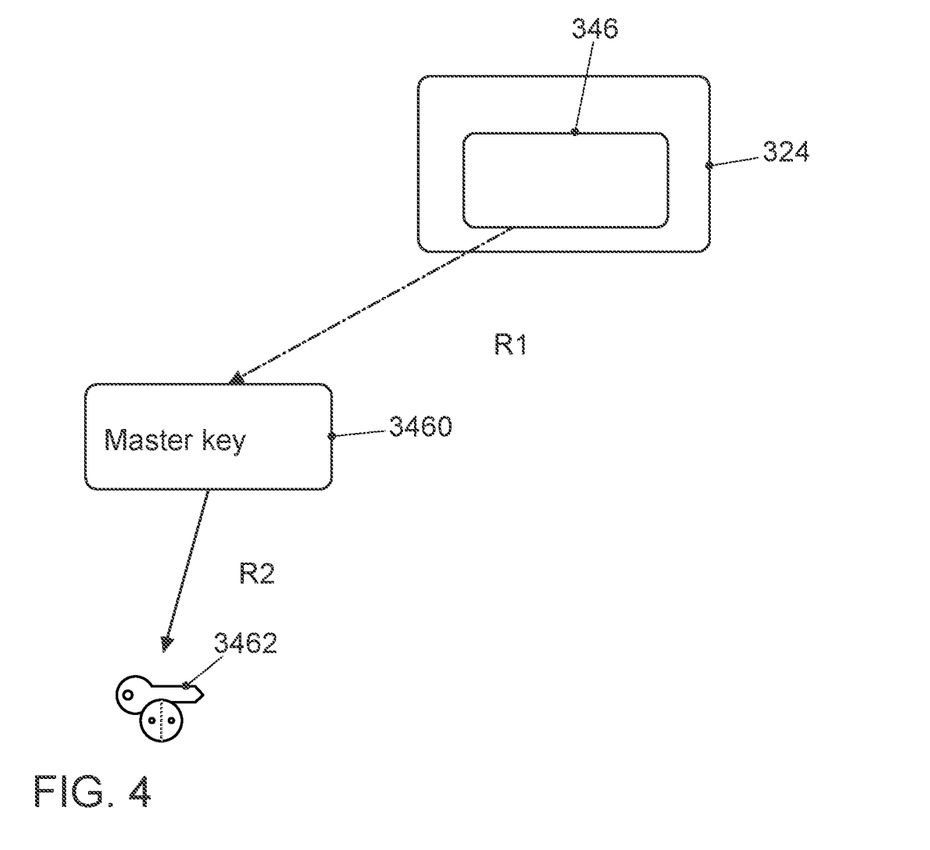
FIG. 4 shows a schematic representation of the sequence of process of key derivation for a specific vehicle that communicates with an Internet service provider according to an embodiment.

FIG. 4 schematically shows an exemplary procedure according to which the keys are calculated in a backend server 320 of a service provider when secured communication is to be carried out. The associated domain master key groups are provided to the different service domains. The master key 3460 appropriate for the requesting vehicle 10 is selected in step R1 from the domain master key group 346. How this occurs will be explained in greater detail below. In step R2, the required communication key 3462 is derived from the master key. The key derivation models are assumed to be known in principle. As an example, reference is made to the parallel application EP 3 157 281 A1. The communication key generated in the backend server 320 is then available for secure communication with the vehicle.

Figure 5:
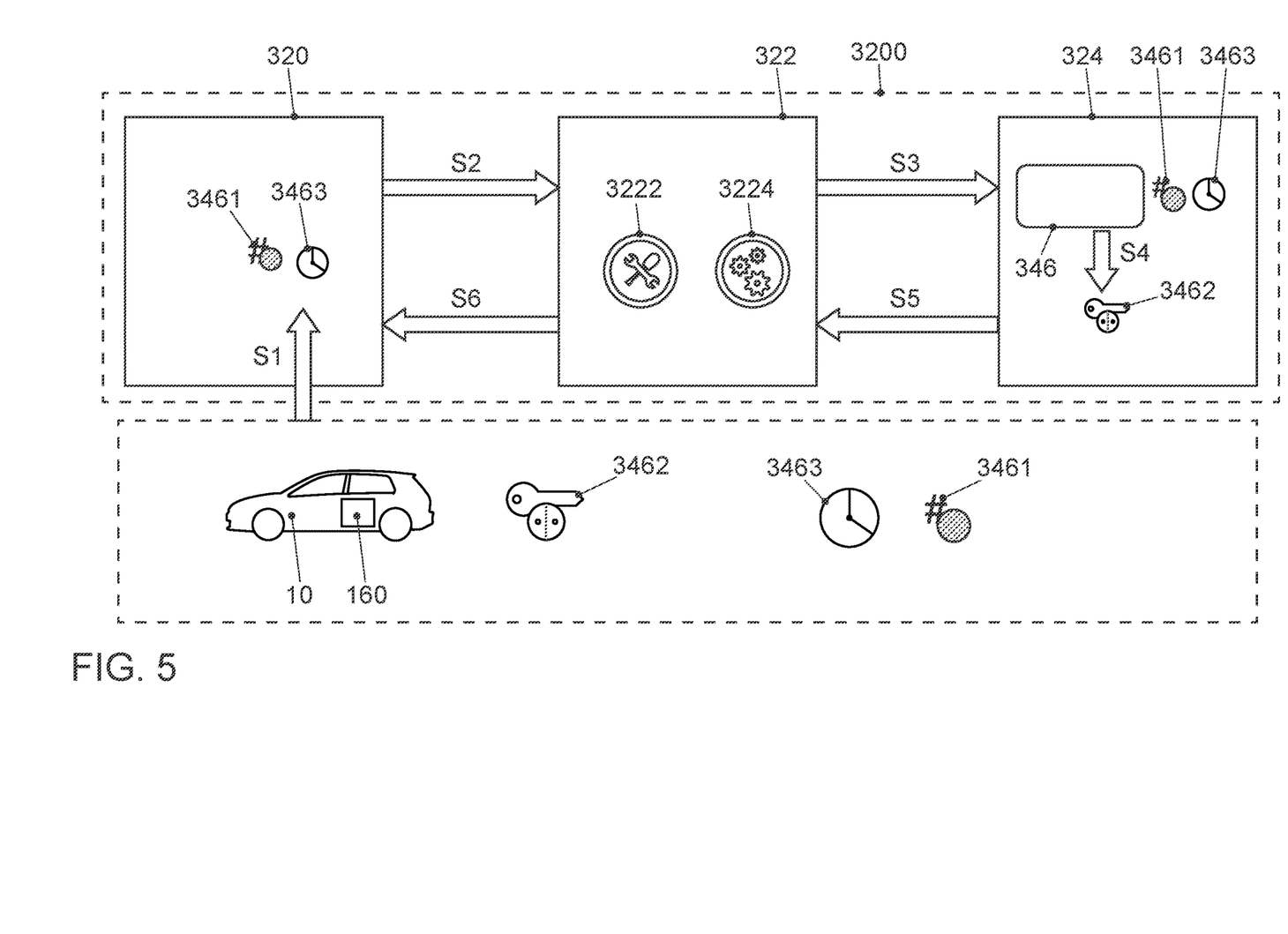
FIG. 5 shows a schematic representation of the sequence of protected communication between a vehicle and an Internet service provider according to an embodiment.

FIG. 5 schematically displays an exemplary general procedure of secured communication. In step S1, the vehicle 10 sends a request to a backend server 320 of a service provider 3200 that is part of the trusted group of the vehicle manufacturer. It may be a request for the HTTPS protocol that reaches the backend server 320 through the Internet connection of the mobile communication system where the vehicle 10 is logged on. In the request or in a following message after setting up the connection to the backend server 320, a data record is transmitted with the master key reference 3461 and the current key state 3463 to the backend server 320. The backend server 320 uses the CSP software 322, corresponding to "cryptographic service provider", installed therein, in order to implement the information and extract the relevant data from the data record. To accomplish this, the software component 3222 is used after the data record has been delivered to the CSP software 322 in step S2. The extracted data, i.e., the master key reference 3461 and the current key state 3463 are sent to an HSM module 324, corresponding to "hardware security module", in step S3. This module is situated at the service provider. Alternatively, it may be at a different location of the service provider to which however an independent datalink exists that is not routed through the Internet. The master key group 346 of the service provider is saved in the HSM module 324. In step S4, the valid master key 3460 is selected from the master key group 346 with the assistance of the master key reference 3461 and the current key state 3463 from the communication key 3462 is derived therefrom. This occurs as described in conjunction with FIG. 4. In step S5, the derived key is transmitted to the CSP software 322 that uses the key 3462 to authenticate or if necessary decrypt the secured communication with the vehicle 10. The responses to the vehicle 10 may also be encrypted with this communication key. To accomplish this, the key use component 3224 is installed in the CSP software. For secured communication, certificates 3464 and 3466 are also used with which the messages are signed in order to increase security by certifying that the delivered data originate from the vehicle 10.

The disclosure is not limited to the above-described exemplary embodiments. There is scope for various adaptations and modifications that a person skilled in the art would consider based on their knowledge in the art and in connection with the present disclosure.

It should be understood that all examples mentioned herein and conditional phrases used herein are not restricted to such specifically cited examples. A person skilled in the art would therefore recognize, for example, that the block diagram shown here is a conceptual view of an exemplary circuit arrangement. Similarly, it should be acknowledged that any flow diagram, state transition diagram, pseudocode and the like shown are different variants for demonstrating processes which may substantially be stored in computer-readable media and which may therefore be executed by a computer or processor.

It should be understood that the proposed method and the associated devices may be implemented in various forms of hardware, software, firmware, special processors or a combination thereof. Special processors may include application-specific integrated circuits (ASICs), reduced instruction set computers (RISC) and/or field-programmable gate arrays (FPGAs). For example, the proposed method and the device are implemented as a combination of hardware and software. The software may for example be installed as an application program on a program memory device. Typically, said device is a machine based on a computer platform that comprises hardware, such as one or more central processing units (CPU), a random-access memory (RAM) and one or more input/output (I/O) interfaces. Typically, an operating system is also installed on the computer platform. The various processes and functions described here may be part of the application program or a part executed by means of the operating system.

LIST OF REFERENCE NUMERALS

10 Vehicle
30 Touch-sensitive display unit
40 Computing unit
50 Input unit
60 Memory unit
70 Data line to display unit
80 Data line to memory unit
90 Data line to input unit
100 Data bus
110 Instrument cluster
120 Telephone
130 Navigation device
140 Radio
150 Camera
160 Communication module
170 Vehicle measuring unit
200 Evolved packet core
210 Base station
300 Internet
310 Road side unit
320 Backend server
322 CSP software
324 HSM module
340 Service domains
342 1st master key group
344 2nd master key group
346 3rd master key group
3200 Service provider 3222 1st software component
3224 Key use component
3400 Key file
3402 MKR file
3420 1st master key
3422 Generic key
3424 1st cryptographic key
3426 2nd cryptographic key
3460 2nd master key
3461 Master key reference
3462 3rd cryptographic key
3463 Key state
P1-P4 Different steps of a method for key derivation
S1-S6 Different states of a method for protected communication by a vehicle In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for protected communication between a vehicle and an external server, comprising:
   obtaining a number of master keys for different service domains;
   generating a master key reference for at least one master key of the number of master keys;
   storing in the vehicle at least one cryptographic key derived from the at least one master key and from a key state;
   storing the master key reference associated with the at least one master key and the key state in the vehicle;
   transmitting from the vehicle to an external server a message, signed with the cryptographic key, wherein the message is additionally provided with the master key reference and the key state of the vehicle;
   deriving a cryptographic key in the external server from the master key identified by the master key reference depending on the key state of the vehicle; and
   checking authenticity of the signed message with the derived cryptographic key by the external server.

2. The method of claim 1, wherein the message is signed with the cryptographic key that corresponds to the current key state of the vehicle.

3. The method of claim 1, wherein service domains are distinguished using one or more of criteria of vehicle make, vehicle model, year of manufacturer, and distribution country.

4. The method of claim 1, wherein different master keys are defined for different service providers or service domains.

5. The method of claim 1, wherein the external server forwards at least information on the master key reference and the key state of the vehicle to a cryptographic service provider that performs a derivation of the cryptographic key and transmits it back to the external server.

6. The method of claim 1, wherein a cryptographic service provider performs the derivation of the cryptographic key itself using a hardware security module, or sends it to another cryptographic service provider that performs the derivation of the cryptographic key using the hardware security module.

7. The method of claim 1, wherein the cryptographic key is derived for individual vehicles using a vehicle identification number.

8. The method of claim 4, wherein a key type determines properties of the key and a derivation path.

9. The method of claim 2, wherein the service domains are distinguished using one or more of criteria of vehicle make, vehicle model, year of manufacturer, and distribution country.

10. The method of claim 2, wherein different master keys are defined for different service providers or service domains.

11. The method of claim 3, wherein different master keys are defined for different service providers or service domains.

12. The method of claim 2, wherein the external server forwards at least information on the master key reference and the key state of the vehicle to a cryptographic service provider that performs a derivation of the cryptographic key and transmits it back to the external server.

13. The method of claim 3, wherein the external server forwards at least information on the master key reference and the key state of the vehicle to a cryptographic service provider that performs a derivation of the cryptographic key and transmits it back to the external server.

14. The method of claim 4, wherein the external server forwards at least information on the master key reference and the key state of the vehicle to a cryptographic service provider that performs a derivation of the cryptographic key and transmits it back to the external server.

15. The method of claim 2, wherein a cryptographic service provider performs the derivation of the cryptographic key itself using a hardware security module, or sends it to another cryptographic service provider that performs the derivation of the cryptographic key using the hardware security module.

16. The method of claim 3, wherein a cryptographic service provider performs the derivation of the cryptographic key itself using a hardware security module, or sends it to another cryptographic service provider that performs the derivation of the cryptographic key using the hardware security module.

17. A device for performing key derivations in the method of claim 1, wherein the device comprises a hardware security circuit, configured to derive a cryptographic key from a saved master key that is selected in a received message by a master key reference noted therein.

18. The device of claim 17, wherein the hardware security circuit is configured such that, to derive the key, it also takes into account a key state transmitted by the vehicle.

19. A vehicle with at least one processor, wherein the processor is configured for use in protected communication between the vehicle and an external server, and wherein the processor is further configured for:
   obtaining, from a protected memory area, at least one cryptographic key derived from at least one master key and a current key state;
   obtaining, from another memory area, a master key reference, associated with the at least one master key;
   obtaining from the other memory area, the a current key state of the vehicle;
   signing, with the derived cryptographic key, a message, wherein the message is additionally provided with the master key reference and the current key state of the vehicle; and transmitting the message to an external server to allow authentication of the signed message from the vehicle by the server.

20. A method for protected communication between a vehicle and an external server, comprising:
   obtaining a number of master keys for different service domains;
   generating a master key reference for at least one master key of the number of master keys;
   storing in the vehicle at least one cryptographic key derived from the at least one master key and from a key state;
   storing the master key reference associated with the at least one master key and the key state in the vehicle;
   transmitting from the vehicle to an external server a message, having an encrypted part that is encrypted with the cryptographic key, wherein the message is additionally provided with the master key reference and the key state of the vehicle, wherein the master key reference and the key state of the vehicle are transmitted unencrypted;
   deriving a cryptographic key in the external server from the master key identified by the master key reference depending on the key state of the vehicle; and
   decrypting the encrypted part with the derived cryptographic key by the external server.

21. A vehicle with at least one processor, wherein the processor is configured for use in protected communication between the vehicle and an external server, and wherein the processor is further configured for:
   obtaining, from a protected memory area, at least one cryptographic key derived from at least one master key and a current key state;
   obtaining, from another memory area, a master key reference, associated with the at least one master key;
   obtaining from the other memory area, a current key state of the vehicle;
   encrypting, with the cryptographic key, a message, wherein the message is additionally provided with the master key reference and the current key state of the vehicle, wherein the master key reference and the key state of the vehicle are transmitted unencrypted; and
   transmitting the message to an external server to allow decryption of the encrypted message from the vehicle by the server.

* * * * *